United States Patent
Tseng et al.

(10) Patent No.: US 8,107,250 B2
(45) Date of Patent: *Jan. 31, 2012

(54) DISPLAY SCREEN AND SENSOR MODULE THEREOF

(75) Inventors: Tsung-Chi Tseng, Hsinchu (TW); Yung-Lung Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 909 days.

This patent is subject to a terminal disclaimer.

(21) Appl. No.: 12/127,042

(22) Filed: May 27, 2008

(65) Prior Publication Data

US 2009/0160834 A1 Jun. 25, 2009

(30) Foreign Application Priority Data

Dec. 21, 2007 (TW) .............................. 96149190 A

(51) Int. Cl.
*H05K 5/00* (2006.01)
(52) U.S. Cl. .................. 361/752; 361/810; 361/807
(58) Field of Classification Search .................. 361/752, 361/807, 810
See application file for complete search history.

(56) References Cited

U.S. PATENT DOCUMENTS

| | | | |
|---|---|---|---|
| 6,614,422 B1 * | 9/2003 | Rafii et al. .................. 345/168 |
| 6,710,318 B2 | 3/2004 | Lin |
| 6,765,648 B2 * | 7/2004 | Takahara ........................ 355/67 |
| 7,016,711 B2 * | 3/2006 | Kurakane .................. 455/575.1 |
| 7,031,670 B2 * | 4/2006 | May ............................. 455/90.3 |
| 7,126,816 B2 * | 10/2006 | Krah ........................ 361/679.55 |
| 7,256,987 B2 * | 8/2007 | Weng ........................ 361/679.55 |
| 7,554,523 B2 * | 6/2009 | Chang et al. .................. 345/156 |
| 7,596,832 B2 * | 10/2009 | Hsieh et al. ...................... 16/342 |
| 7,750,282 B2 * | 7/2010 | Mahowald et al. ...... 250/214 AL |
| 7,894,197 B2 * | 2/2011 | Hwang et al. ................. 361/752 |
| 2007/0165372 A1 * | 7/2007 | Ye .................................. 361/683 |
| 2008/0165115 A1 * | 7/2008 | Herz et al. ..................... 345/102 |
| 2008/0316472 A1 * | 12/2008 | Hwang et al. ................. 356/213 |
| 2010/0020182 A1 * | 1/2010 | Wang et al. ................. 348/207.1 |

FOREIGN PATENT DOCUMENTS

| | | |
|---|---|---|
| TW | M265666 | 5/2005 |
| TW | 200612364 | 4/2006 |
| TW | I280409 | 5/2007 |

OTHER PUBLICATIONS

English language translation of abstract of TW M265666 (published May 12, 2005).
English language translation of abstract of TW 200612364 (published Apr. 16, 2006).
English language translation of abstract of TW I280409 (published May 1, 2007).

* cited by examiner

*Primary Examiner* — Bipin Shalwala
*Assistant Examiner* — Jonathan King
(74) *Attorney, Agent, or Firm* — Thomas|Kayden

(57) ABSTRACT

A display screen with a display area includes a frame and a sensor module. The frame surrounds the display area. The sensor module is mounted on the frame and includes a mount disposed on the frame and a slidable assembly slidably disposed on the mount and including an ambient light sensor and a screen light sensor, wherein the ambient light sensor and the screen light sensor are disposed on two opposite sides of the slidable assembly respectively. When a side of the slidable assembly on which the screen light sensor is disposed faces the display area, the screen light sensor detects brightness of the display area. When the side of the slidable assembly does not face the display area, the ambient light sensor detects brightness of an ambiance.

22 Claims, 11 Drawing Sheets

DISPLAY SCREEN AND SENSOR MODULE THEREOF

BACKGROUND OF THE INVENTION

1. Field of the Invention

The invention relates to a display screen and a sensor module thereof, and more particularly to a display screen and a sensor module thereof with a convenient assembly process and a switching design.

2. Description of the Related Art

With the rapid advancement of technology, the quality of human life has been highly upgraded. Today, displays with lighter weights and slimmer designs have replaced conventional large-sized expensive displays.

Referring to FIG. 1, a schematic view of a conventional display screen is shown. The display screen 10 has a frame 11 and a screen 12. The frame 11 surrounds the screen 12 and has a screen light sensor 13 and an ambient light sensor 14, wherein the screen light sensor 13 is disposed on a side surface 11a of the frame 11 to detect color condition of the screen 12, and the ambient light sensor 14 is disposed on a front surface 11b of the frame 11 to detect color condition of the ambiance.

For the conventional display screen, however, the screen light sensor 13 and the ambient light sensor 14 are mounted on the frame 11 in different positions. Thus, the assembly process of the conventional display screen 10 is complicated and demands relatively more labor and time, thus raising costs and reducing manufacturing efficiency. Furthermore, because the screen light sensor 13 is disposed in front of the screen 12, the screen light sensor 13 partially covers the screen 12, thus reducing the available area of the screen 12.

BRIEF SUMMARY OF THE INVENTION

The present invention is to provide a display screen, wherein a screen light sensor and an ambient light sensor are assembled in a sensor module which is conveniently mounted in or removed from the display screen, thereby reducing time, labor, and costs, and raising manufacturing efficiency.

The present invention is to provide a sensor module, wherein the sensor module is designed as a switching type sensor module to prevent the screen module from covering areas of the screen, thus significantly increasing the available area of the screen.

In an embodiment of the present invention, a sensor module for a frame of a display screen is provided wherein the display screen has a display area surrounded by the frame. The sensor module includes a mount and a slidable assembly. The mount is disposed on the frame. The slidable assembly is slidably disposed on the mount and includes an ambient light sensor and a screen light sensor, wherein the ambient light sensor and the screen light sensor are disposed on two opposite sides of the slidable assembly respectively. When a side of the slidable assembly on which the screen light sensor is disposed faces the display area, the screen light sensor detects brightness of the display area, and when the side of the slidable assembly does not face the display area, the ambient light sensor detects brightness of an ambiance.

In an embodiment of the present invention, a display screen with a display area includes a frame and a sensor module. The frame surrounds the display area. The sensor module is mounted on the frame and includes a mount disposed on the frame and a slidable assembly, slidably disposed on the mount and including an ambient light sensor and a screen light sensor, wherein the ambient light sensor and the screen light sensor are disposed on two opposite sides of the slidable assembly respectively. When a side of the slidable assembly on which the screen light sensor is disposed faces the display area, the screen light sensor detects brightness of the display area, and when the side of the slidable assembly does not face the display area, the ambient light sensor detects brightness of an ambiance.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing,"

"faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the conditions that "A" component directly faces "B" component or one or more additional components are between "A" component and "B" component. Also, the description of "A" component "adjacent to" "B" component herein may contain the conditions that "A" component is directly "adjacent to" "B" component or one or more additional components are between "A" component and "B" component. Accordingly, the drawings and descriptions will be regarded as illustrative in nature and not as restrictive.

Figure 1:
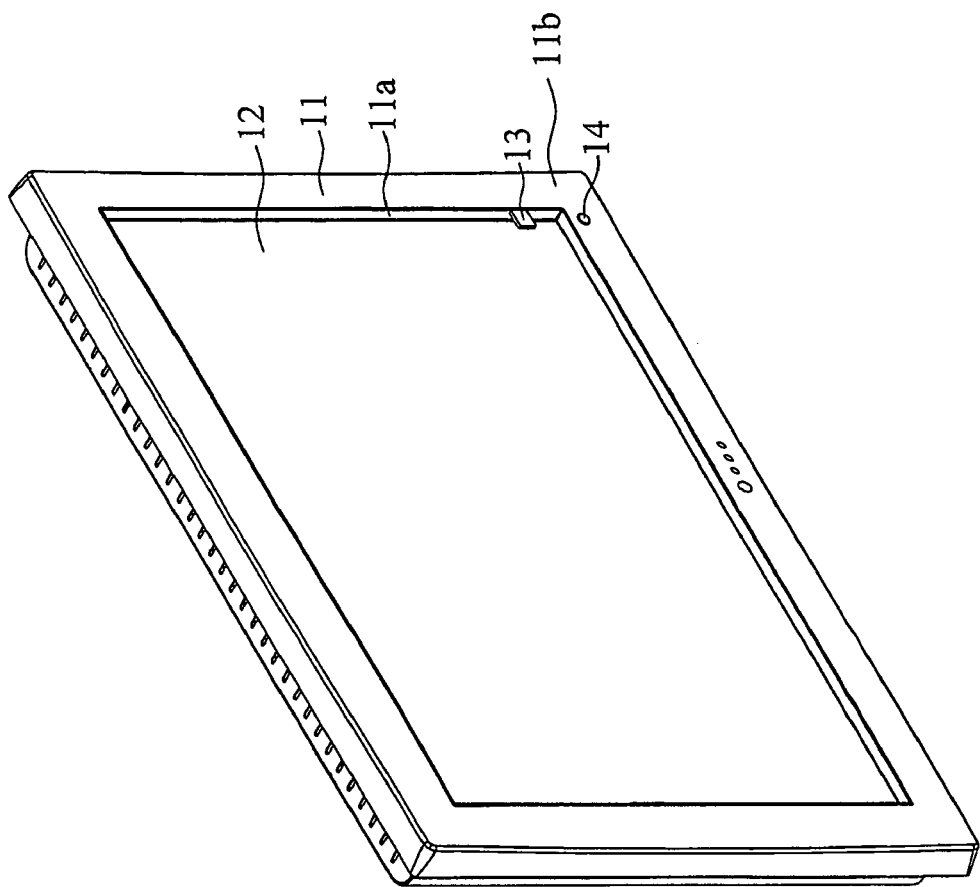
FIG. 1 is a schematic view of a conventional display screen.
Figure 2A:
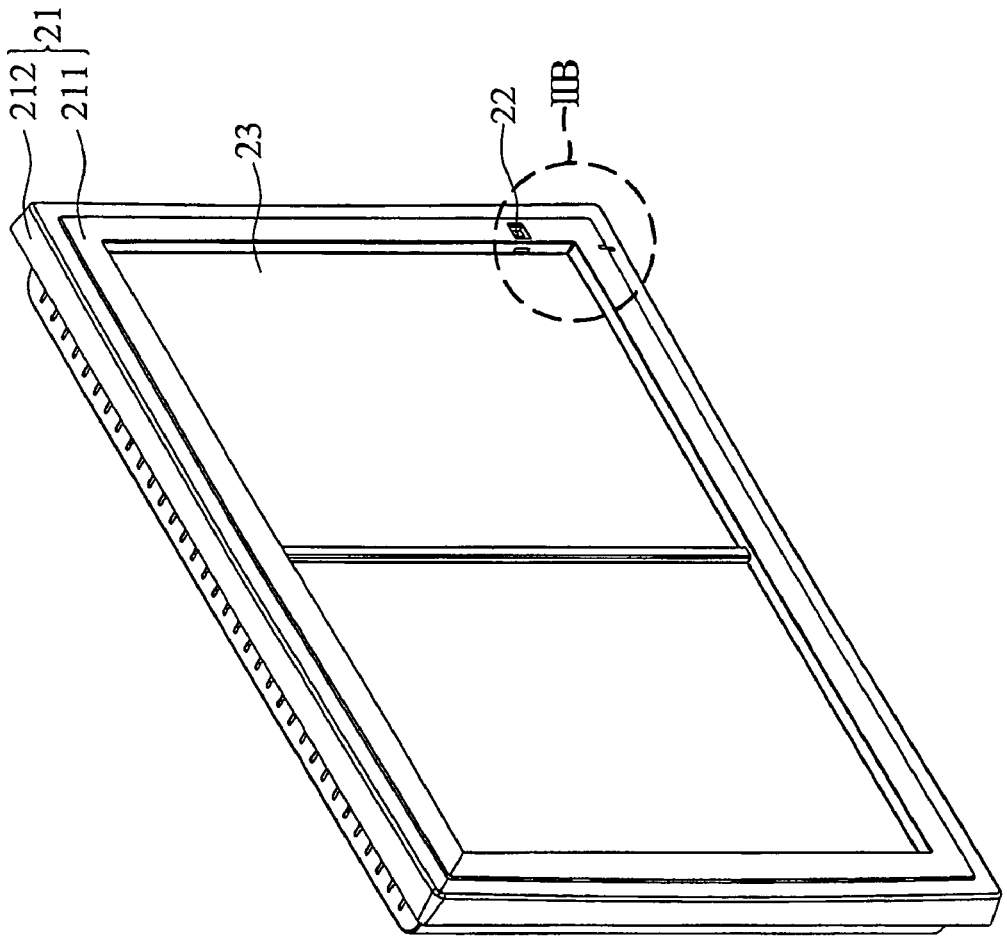
FIG. 2A is a schematic view of a display screen in accordance with an embodiment of the invention.
Figure 2B:
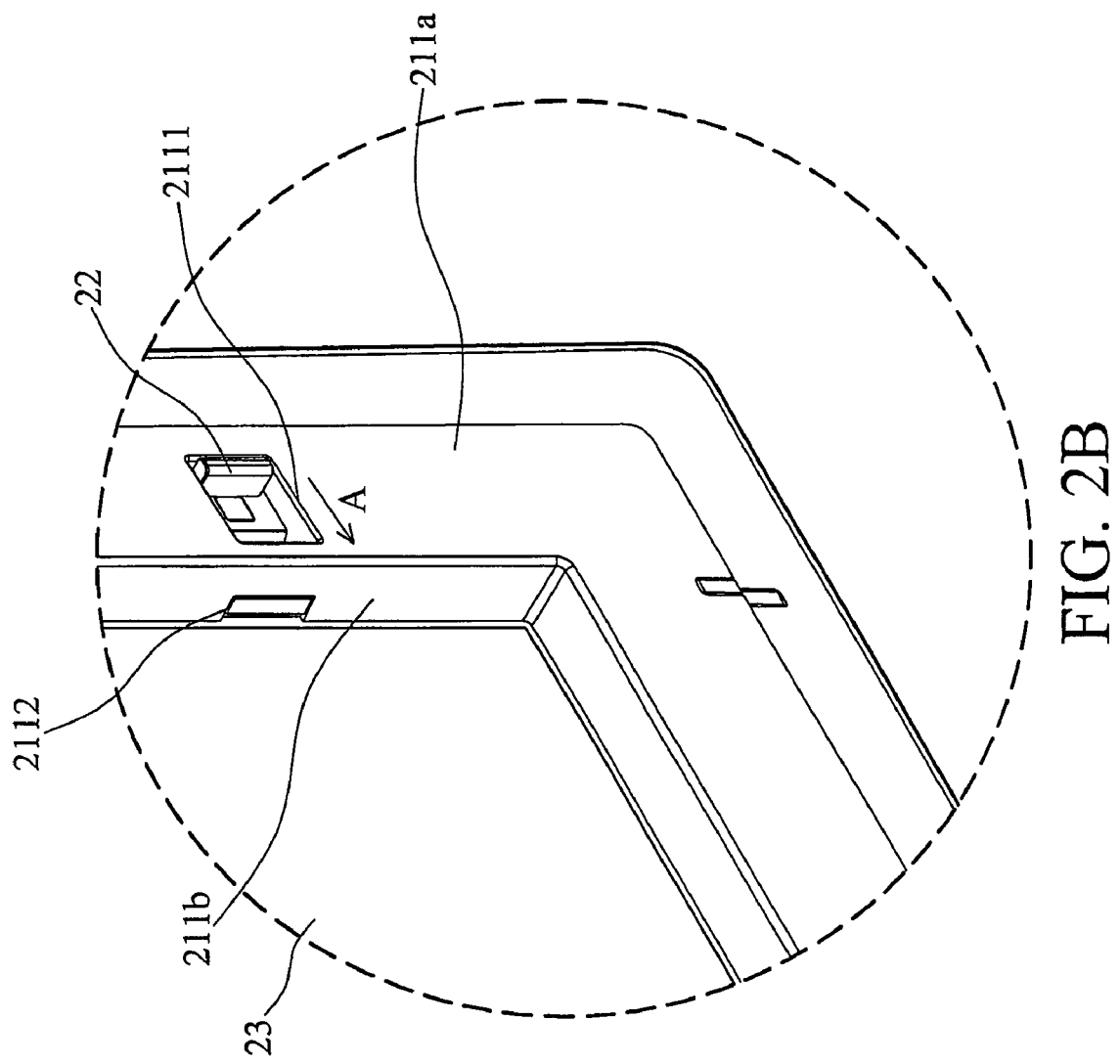
FIG. 2B is a partially enlarged view of the display screen of FIG. 2A.
Figure 2C:
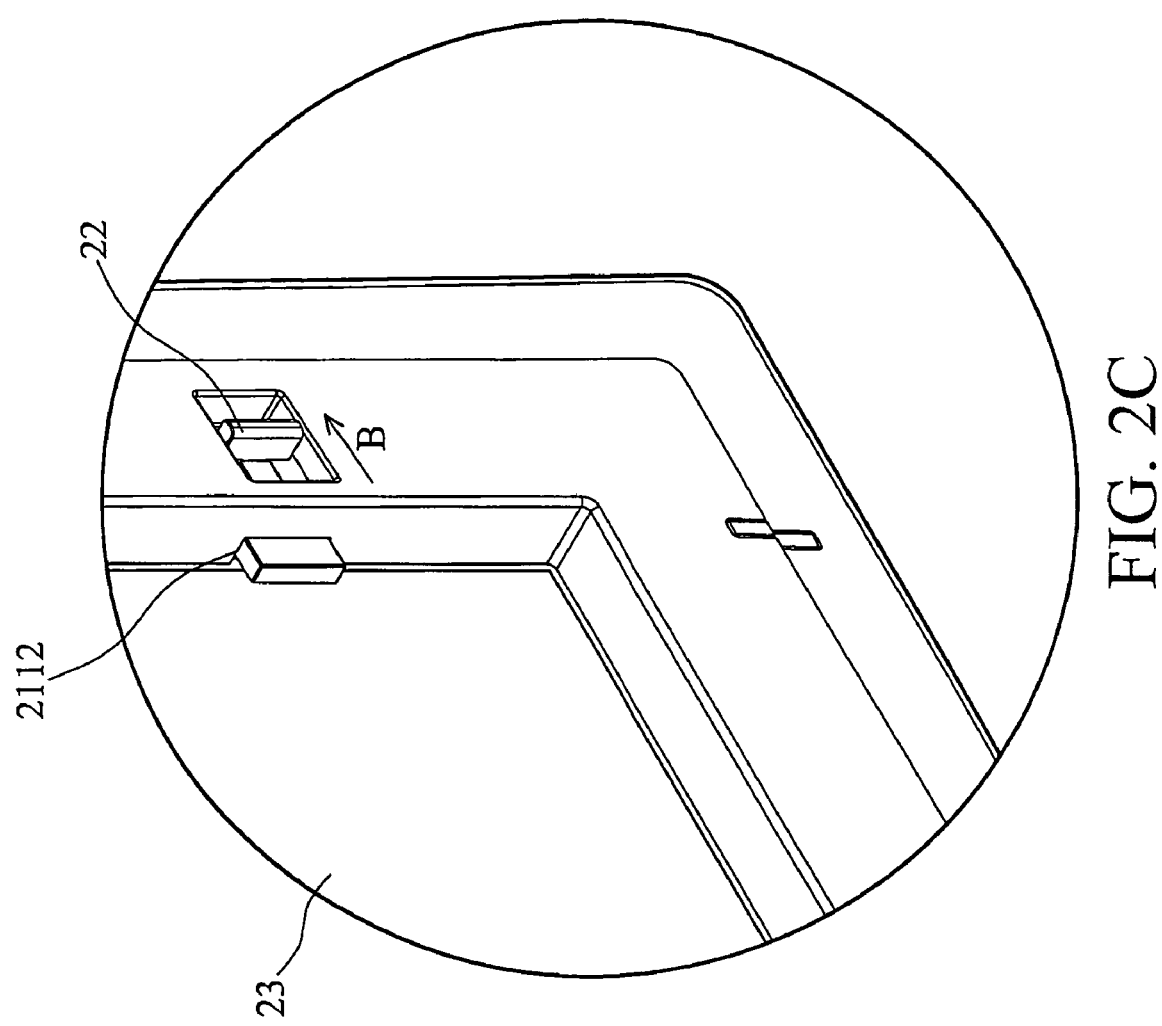
FIG. 2C is a partially enlarged view of a switched sensor module in accordance with an embodiment of the invention.

Referring to FIGS. 2A, 2B, and 2C, a display screen 20 (e.g. a liquid crystal display) of an embodiment of the present invention with a display area 23 is shown. The display screen 20 includes a frame 21 and a sensor module 22. The frame 21 surrounds the display area 23 and includes a front bezel 211 and a back case 212, wherein the front bezel 211 has a first window 2111 disposed on a front surface 211a of the front bezel 211, and a second window 2112 disposed on a side surface 211b of the front bezel 211. The sensor module 22 is mounted on the frame 21. Specifically, the sensor module 22 is disposed between the first window 2111 and the second window 2112.

Figure 3:
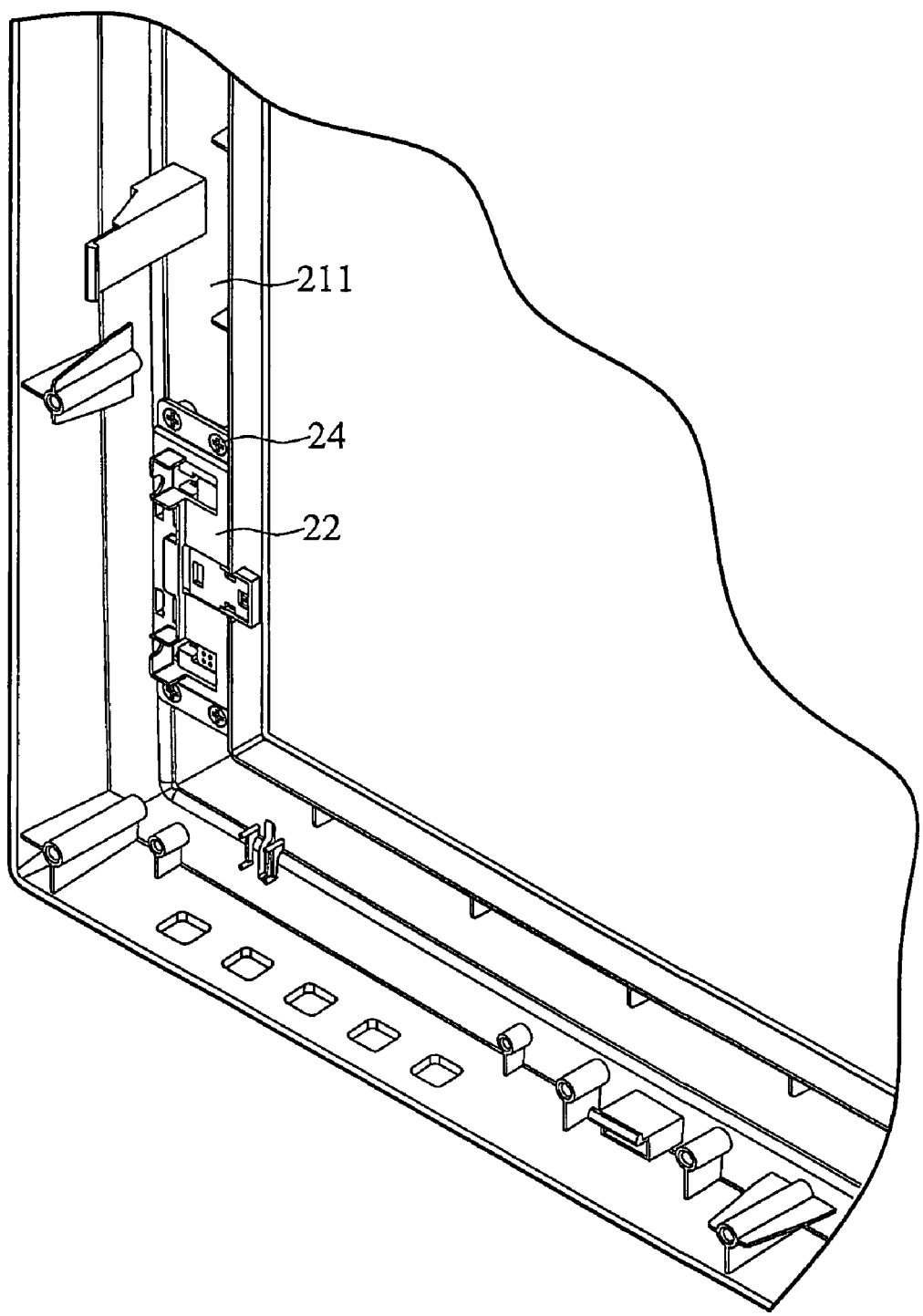
FIG. 3 is an assembly drawing of a front bezel and a sensor module in accordance with an embodiment of the invention.

Referring to FIG. 3, an assembly drawing of the front bezel and a sensor module of an embodiment of the present invention is shown. In this embodiment, the sensor module 22 is fixed on the front bezel 211 by screws 24.

Figure 4:
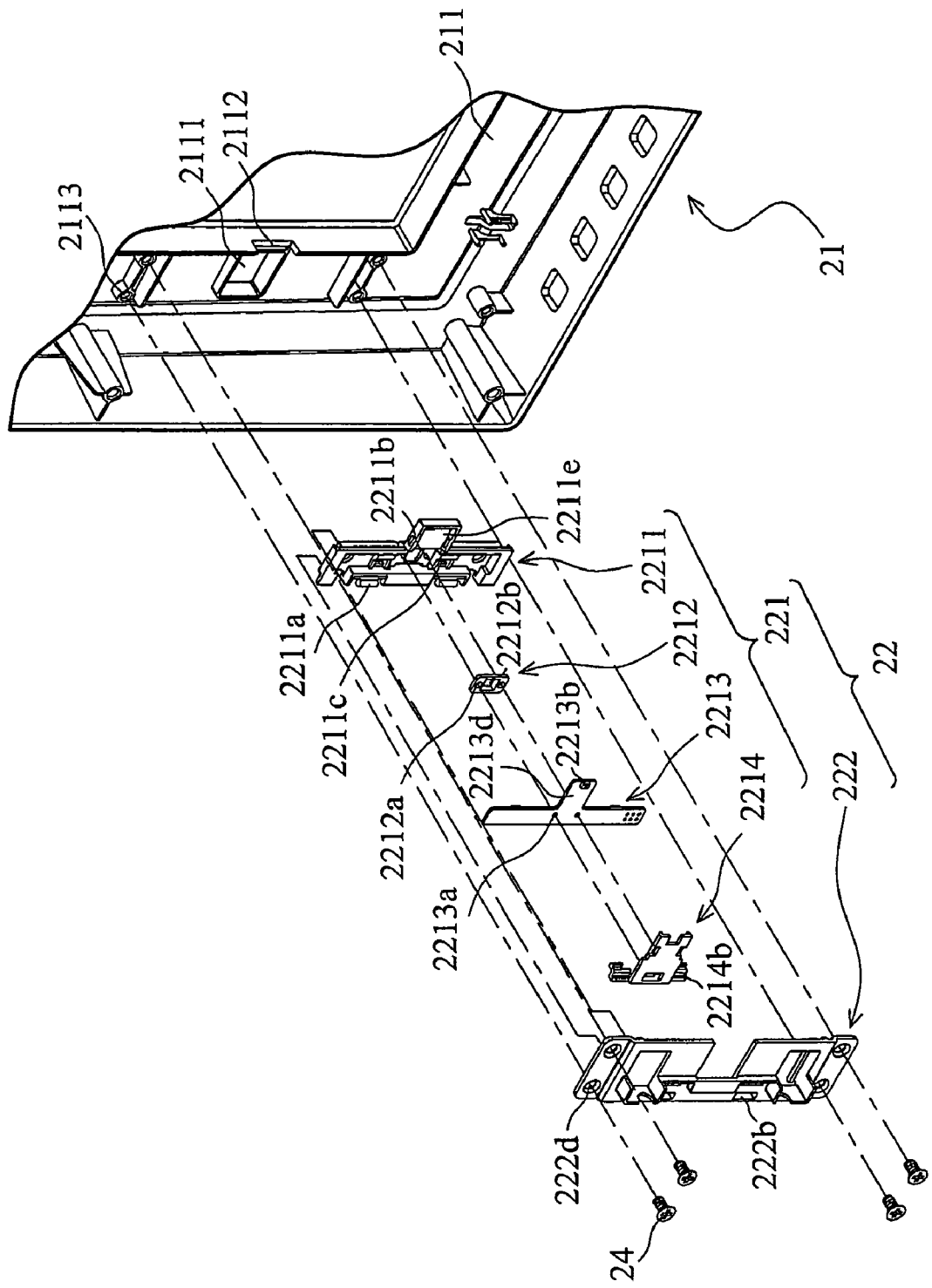
FIG. 4 is an exploded view of the front bezel and the sensor module of FIG. 3.
Figure 5:
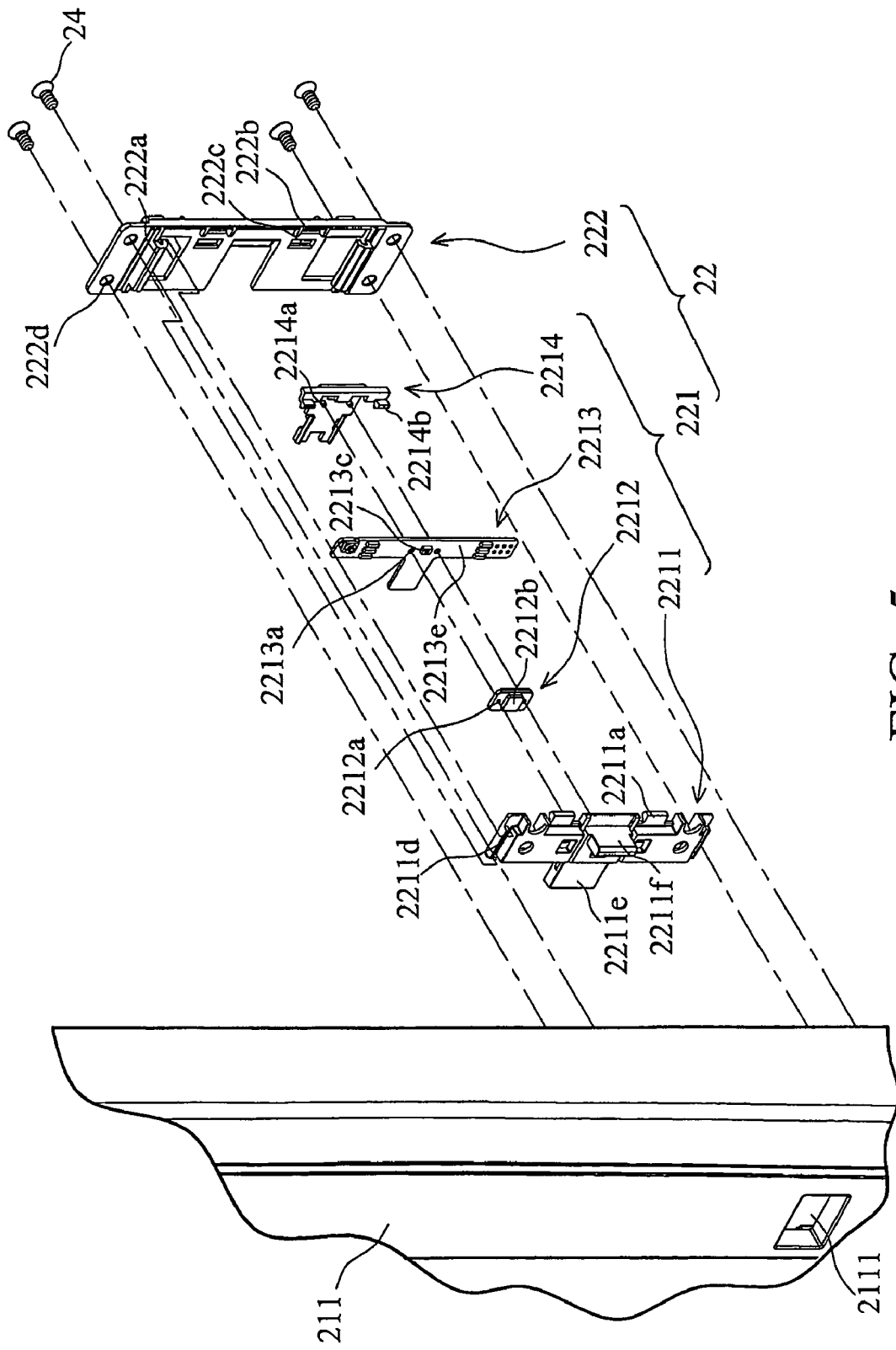
FIG. 5 is another exploded view of the front bezel and the sensor module of FIG. 3 observed from a different direction.

Referring to FIG. 4, an exploded view of the front bezel and the sensor module of FIG. 3, and FIG. 5, another exploded view of the front bezel and the sensor module of FIG. 3 observed from a different direction are shown. The sensor module 22 of the embodiment includes a slidable assembly 221 and a mount 222. The mount 222 is disposed on the frame 21. The slidable assembly 221 is slidably disposed on the mount 222 and includes an ambient light sensor 2213c and a screen light sensor 2213b, and the ambient light sensor 2213c and the screen light sensor 2213b are respectively disposed on two opposite sides of the slidable assembly 221 for detecting light projected thereon.

In the embodiment, the ambient light sensor 2213c and the screen light sensor 2213b are disposed on two opposite sides of the printed circuit board 2213, respectively. Positions of the first side 2213d of the slidable assembly 221 on which the screen light sensor 2213b is disposed and the second side 2213e of the slidable assembly 221 on which the ambient light sensor 2213c is disposed are not aligned. Thus, the screen light sensor 2213b detects brightness of a display area 23 when the first side 2213d of the slidable assembly 221 on which the screen light sensor 2213b is disposed faces the display area 23 (as shown in FIG. 2C). The ambient light sensor 2213c detects brightness of an ambiance when the first side 2213d of the slidable assembly 221 does not face the display area 23 (as shown in FIG. 2B).

In detail, the sensor module 22 of the display screen 20 continuously detects the color condition of the ambiance when the sensor module 22 is located in a first position (as shown in FIG. 2B). To detect the color condition of the display area 23, the sensor module 22 is pushed in a direction of arrow A. Thus, the sensor module 22 is moved from the first position (as shown in FIG. 2B) to a second position (as shown in FIG. 2C). At this time, a part of the sensor module 22 is projected in front of the display area 23 from the second window 2112, to simultaneously detect the color conditions of the ambiance and the display area 23. To finish detecting the color condition of the display area 23, the sensor module 22 is pushed in a direction of arrow B and is then returned to the first position (as shown in FIG. 2B).

To be more specific, the slidable assembly 221 of the embodiment includes a front cover 2211, a lens module 2212, a printed circuit board 2213, and a fastener 2214, and the lens module 2212 and the printed circuit board 2213 are fixed on the front cover 2211 via the fastener 2214 to form the slidable assembly 221, and then the slidable assembly 221 is slidably mounted on the mount 222. All elements and assembly method thereof are described in detail in the following.

The front bezel 211 has the described first window 2111, the described second window 2112, and four inner threaded tubes 2113 disposed above and under the first window 2111, respectively.

The front cover 2211 has two positioning elements 2211a, two protruding columns 2211b, two slots 2211c, two flanges 2211d, a seat 2211e, and a switching key 2211f. The switching key 2211f forces the positioning elements 2211a to move. The lens module 2212 has two through holes 2212a and a lens 2212b. The printed circuit board 2213 has two apertures 2213a, the screen light sensor 2213b, and the ambient light sensor 2213c. The screen light sensor 2213b and the ambient light sensor 2213c are disposed on two opposite sides of the printed circuit board 2213 respectively. The fastener 2214 has two sleeves 2214a and two hooks 2214b. The mount 222 has two rails 222a, two first openings 222b, two second openings 222c, and four threaded holes 222d, wherein the first openings 222b and the second openings 222c are disposed side by side.

The protruding columns 2211b of the front cover 2211 are passed through the through holes 2212a of the lens module 2212 and the apertures 2213a of the print circuit board 213 in sequence, and fixed in the sleeves 2214a of the fastener 2214, and then the hooks 2214b of the fastener 2214 are forced to fasten the slots 2211c of the front cover 2211 to from the slidable assembly 221. Thus, the lens 2212b of the lens module 2212 covers the ambient light sensor 2213c of the printed circuit board 2213 and the screen light sensor 2213b of the printed circuit board 2213 is disposed on the seat 2211e of the front cover 2211.

The flanges 2211d of the front cover 2211 are slidably fitted into the rails 222a of the mount 222 to fix the slidable assembly 221 on the mount 222 and finish the assembly of the sensor module 22. Thus, the positioning elements 2211a of the front cover 2211 engage the first openings 222b or second openings 222c of the mount 222.

The screws 24 are passed through the threaded holes 222d of the mount 222 and fixed into the inner threaded tubes 2113 to mount the sensor module 22 on the front bezel 211 of the display screen 20 (as shown in FIG. 3). Thus, the switching key 221 if of the front cover 2211 is disposed in the first window 2111 and the ambient light sensor 2213c is exposed to the outside of the display screen 20 through the first window 2111 (as shown in FIG. 2B).

Figure 6A:
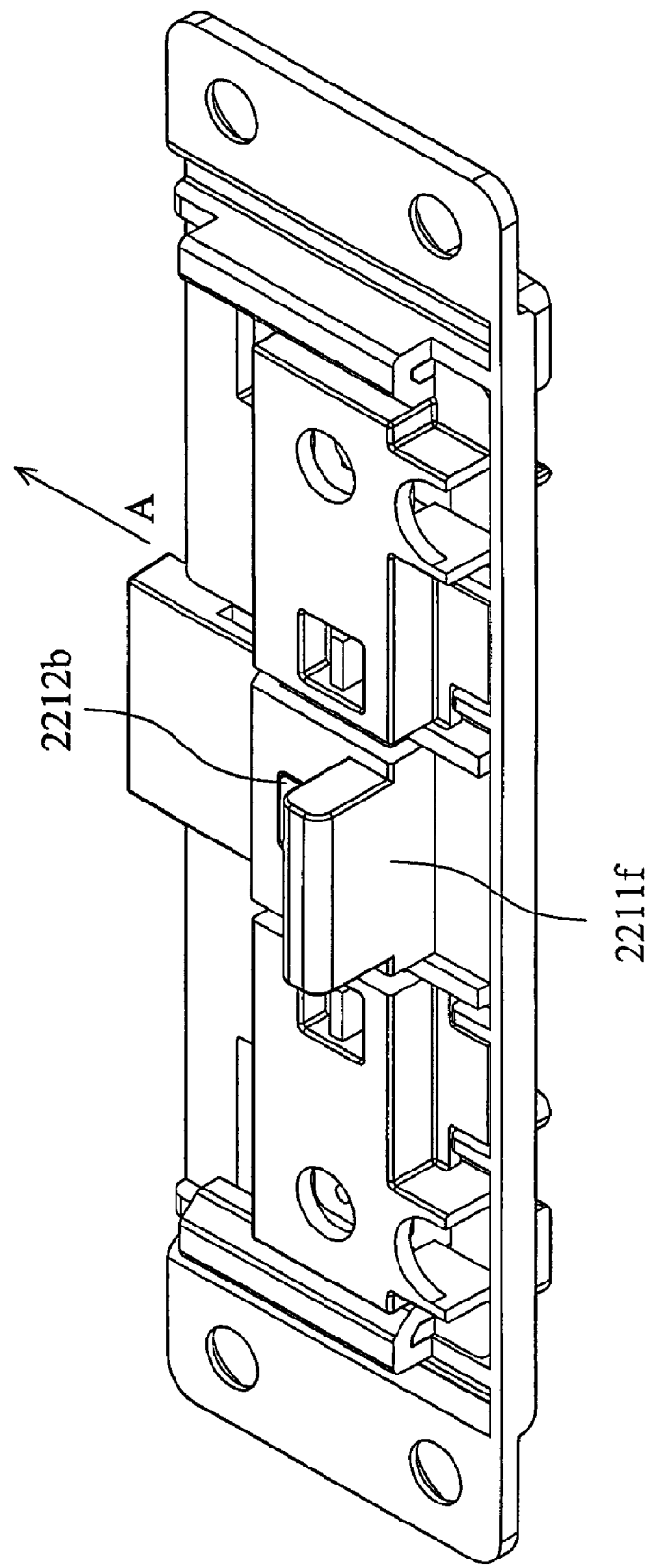
FIGS. 6A and 7A depict an operating process of a sensor module in accordance with the embodiment of the invention.
Figure 7A:
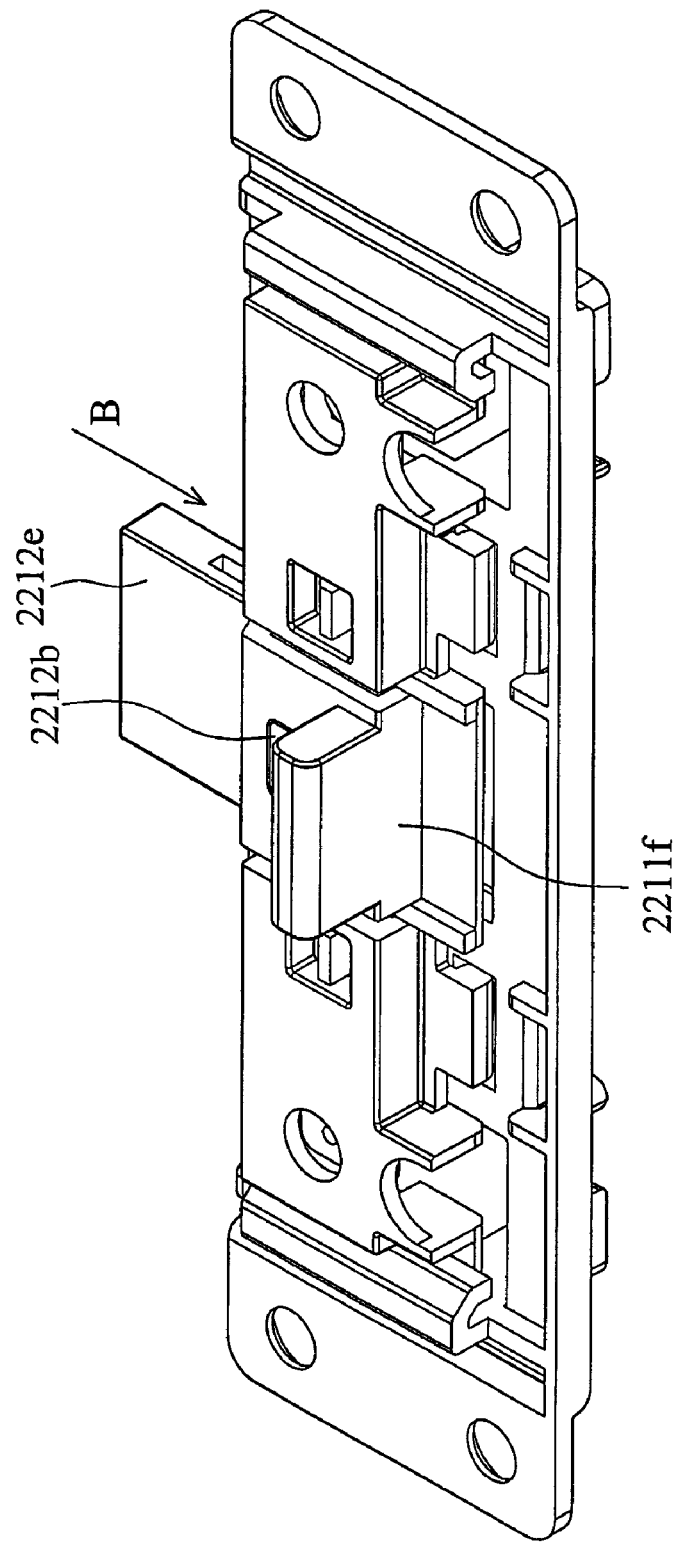

Referring to FIGS. 6A and 7A, an operating process of a sensor module of the embodiment is shown, wherein FIG. 6A depicts the sensor module 22 in a first position, and FIG. 7A depicts the sensor module 22 in a second position.

Figure 6B:
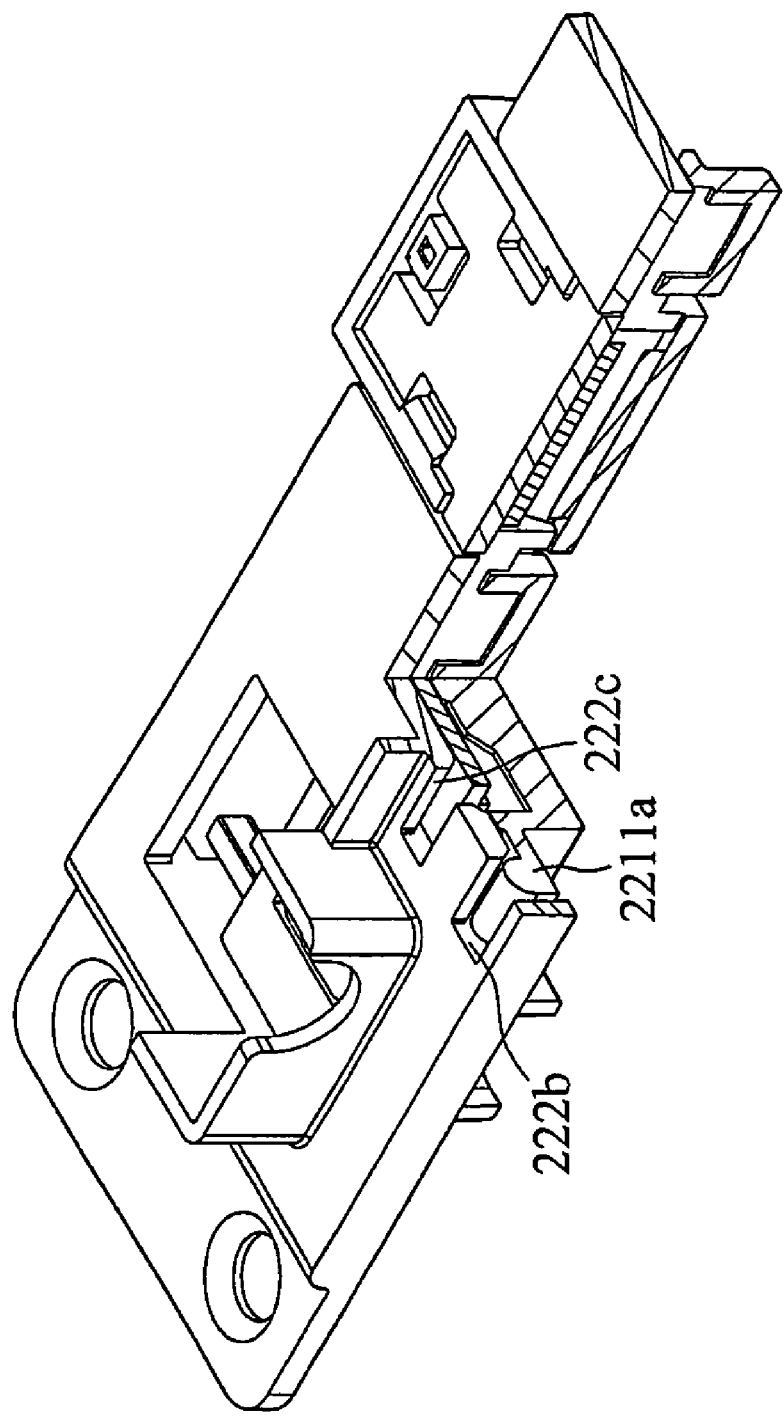
FIG. 6B depicts a part of the sensor module of FIG. 6A, removed to clearly show the internal structure of the sensor module.

The ambient light sensor 2213c covered by the lens 2212b, continuously detects the color condition of the ambiance of the display screen 20 when the sensor module 22 is located in the first position as shown in FIG. 6A. At this time, the positioning elements 2211a of the front cover 2211 engage the first openings 222b of the mount 222 (as shown in FIG. 6B, wherein a part of the sensor module 22 is removed to clearly show the internal structure), and the first side 2213d of the slidable assembly 221 on which the screen light sensor 2213b is disposed does not face the display area 23 (as shown in FIG. 2B).

Figure 7B:
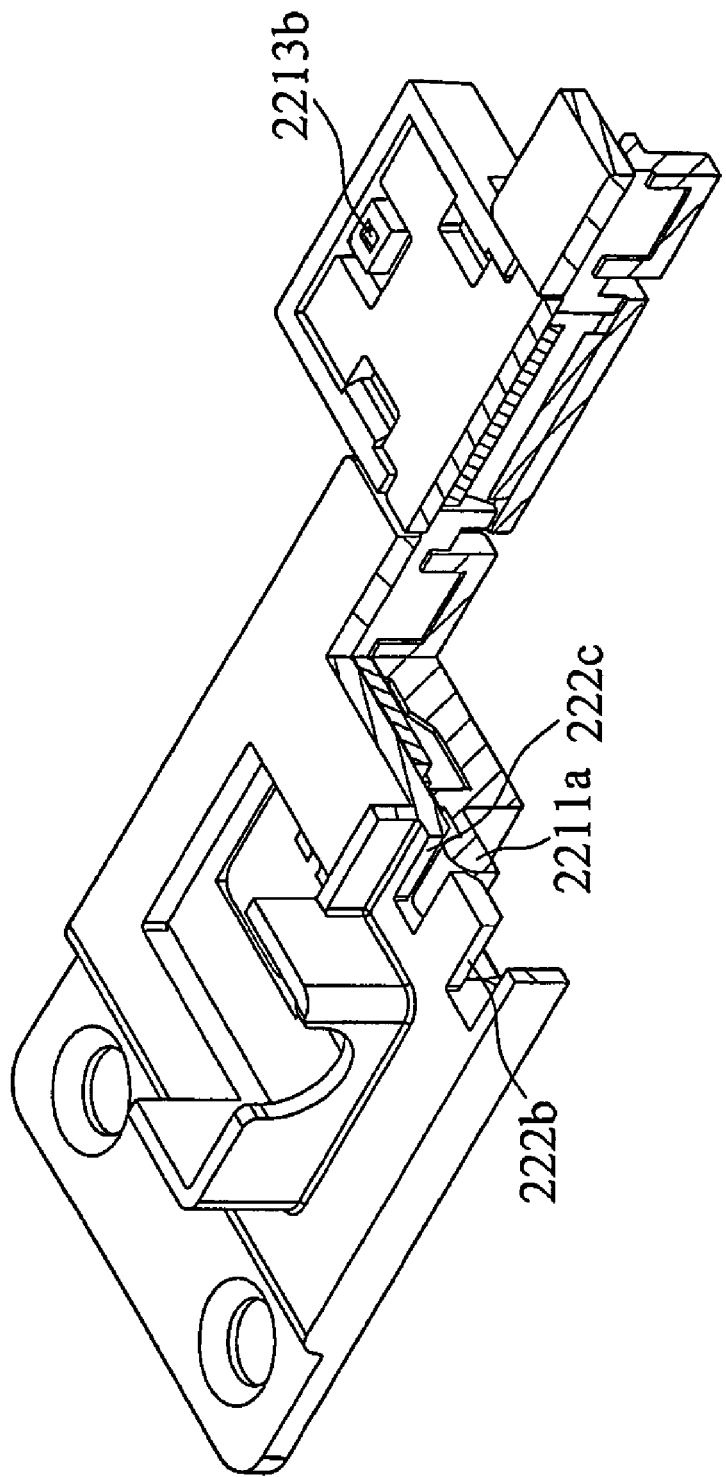
FIG. 7B depicts a part of the sensor module of FIG. 7A, removed to clearly show the internal structure of the sensor module.

To detect the color condition of the display area 23, the switching key 2211f of the front cover 2211 is pushed in a direction of arrow A and then forces the screen light sensor 2213b disposed in the seat 2211e to move in the direction of arrow A. Thus, the sensor module 22 is moved from the first position to the second position (as shown in FIG. 7A) for simultaneously detecting the color condition of the ambiance of the display screen 20 and the display area 23 (as shown in FIG. 2C). At this time, the positioning elements 2211a of the front cover 2211 engage the second openings 222c of the mount 222 (as shown in FIG. 7B, wherein a part of the sensor module 22 is removed to clearly show the internal structure), and the first side 2213d of the slidable assembly 221 on which the screen light sensor 2213b is disposed faces the display area 23 (as shown in FIG. 2C).

To finish detecting the color condition of the display area 23, the switching key 2211f of the front cover 2211 is pushed in a direction of arrow B and then forces the screen light sensor 2213b disposed in the seat 2211e to move in the direction of arrow B. Thus, the sensor module 22 is returned to the first position (as shown in FIG. 6A) to continuously detect ambiance colors of the display screen 20. At this time, the positioning elements 2211a of the front cover 2211 engage the first openings 222b of the mount 222 (as shown in FIG. 6B).

From the above description, the screen light sensor 2213b and the ambient light sensor 2213c are assembled in a sensor module 22 which is conveniently mounted in or removed from the display screen 20, thereby reducing time, labor, and costs, and raising manufacturing efficiency.

Furthermore, the sensor module 22 is designed as a switching type sensor module to prevent the sensor module 22 from covering the display area 23, thus significantly increasing the available area of the display area 23.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A sensor module for a frame of a display screen wherein the display screen has a display area surrounded by the frame, the sensor module comprising:
    a mount disposed on the frame; and
    a slidable assembly slidably disposed on the mount and comprising an ambient light sensor and a screen light sensor, wherein the ambient light sensor and the screen light sensor are disposed on two opposite sides of the slidable assembly respectively, when a side of the slidable assembly on which the screen light sensor is disposed faces the display area, the screen light sensor detects brightness of the display area, and when the side of the slidable assembly on which the screen light sensor is disposed does not face the display area, the ambient light sensor detects brightness of an ambiance.

2. The sensor module as claimed in claim 1, wherein the slidable assembly comprises a front cover, a fastener fixed on the front cover by fastening, and a printed circuit board disposed between the front cover and the fastener.

3. The sensor module as claimed in claim 2, wherein the front cover has a slot, the fastener has a hook, and the hook is disposed into the slot.

4. The sensor module as claimed in claim 3, wherein the front cover further has a protruding column, the printed circuit board has an aperture, the fastener further has a sleeve, and the protruding column is fixed in the sleeve after passing through the aperture.

5. The sensor module as claimed in claim 4, wherein the slidable assembly further comprises a lens module having a through hole and a lens, the ambient light sensor is covered by the lens, and the protruding column passes through the through hole.

6. The sensor module as claimed in claim 2, wherein the ambient light sensor and the screen light sensor are disposed on two opposite sides of the printed circuit board respectively.

7. The sensor module as claimed in claim 2, wherein the front cover has a seat and the screen light sensor is disposed on the seat.

8. The sensor module as claimed in claim 2, wherein the mount has a rail, the front cover has a flange, and the flange slidably passes through the rail.

9. The sensor module as claimed in claim 8, wherein the mount further has a first opening and a second opening disposed side by side, and the front cover further has a positioning element and a switching key forcing the positioning element to move, when the switching key is located in a first position, the positioning element engages the first opening and the side of the slidable assembly on which the screen light sensor is disposed does not face the display area, and when the switching key is located in a second position, the positioning element engages the second opening and the side of the slidable assembly on which the screen light sensor is disposed faces the display area.

10. A display screen with a display area comprising:
    a frame surrounding the display area; and
    a sensor module mounted on the frame and comprising a mount disposed on the frame and a slidable assembly slidably disposed on the mount and comprising an ambient light sensor and a screen light sensor, wherein the ambient light sensor and the screen light sensor are disposed on two opposite sides of the slidable assembly respectively, when a side of the slidable assembly on which the screen light sensor is disposed faces the display area, the screen light sensor detects brightness of the display area, and when the side of the slidable assembly on which the screen light sensor is disposed does not face the display area, the ambient light sensor detects brightness of an ambiance.

11. The display screen as claimed in claim 10 further comprising a screw, wherein the frame has an inner threaded tube, the mount has a threaded hole, and the screw is fixed in the inner threaded tube after passing through the threaded hole.

12. The display screen as claimed in claim 10, wherein the slidable assembly comprises a front cover, a fastener fixed on the front cover by fastening, and a printed circuit board disposed between the front cover and the fastener.

13. The display screen as claimed in claim 12, wherein the front cover has a slot, the fastener has a hook, and the hook is disposed into the slot.

14. The display screen as claimed in claim 13, wherein the front cover further has a protruding column, the printed circuit board has an aperture, the fastener further has a sleeve, and the protruding column is fixed in the sleeve after passing through the aperture.

15. The display screen as claimed in claim 14, wherein the slidable assembly further comprises a lens module having a through hole and a lens, the ambient light sensor is covered by the lens, and the protruding column passes through the through hole.

16. The display screen as claimed in claim 12, wherein the ambient light sensor and the screen light sensor are disposed on two opposite sides of the printed circuit board respectively.

17. The display screen as claimed in claim 12, wherein the front cover has a seat and the screen light sensor is disposed on the seat.

18. The display screen as claimed in claim 12, wherein the mount has a rail, the front cover has a flange, and the flange slidably passes through the rail.

19. The display screen as claimed in claim 18, wherein the mount further has a first opening and a second opening disposed side by side, and the front cover further has a positioning element and a switching key forcing the positioning element to move, when the switching key is located in a first position, the positioning element engages the first opening and the side of the slidable assembly on which the screen light sensor is disposed does not face the display area, and when the switching key is located in a second position, the positioning element engages the second opening and the side of the slidable assembly on which the screen light sensor is disposed faces the display area.

20. The display screen as claimed in claim 19, wherein the frame further has a window and the switching key is disposed in the window.

21. The display screen as claimed in claim 19, wherein when the switching key is located in the first position, the ambient light sensor is exposed to outside of the display screen through the window.

22. The display screen as claimed in claim 10, wherein positions of the side of the slidable assembly on which the screen light sensor is disposed and the other side of the slidable assembly on which the ambient light sensor is disposed are not aligned.

* * * * *